INVENTOR.
WILLIAM W. CUTHBERT

INVENTOR.
WILLIAM W. CUTHBERT

3,267,465
PULSE-GATED RADAR RANGE TRACKING SYSTEM

William W. Cuthbert, Oxnard, Calif., assignor to the United States of America as represented by the Secretary of the Navy
Filed July 6, 1964, Ser. No. 380,710
5 Claims. (Cl. 343—7.3)

The invention described herein may be manufactured and used by or for the Government of the United States of America for governmental purposes without the payment of any royalties thereon or therefor.

This application is a continuation-in-part of application Serial No. 122,057, filed June 28, 1961, now abandoned.

The present invention relates in general to radars. More particularly, it relates to a radar system designed to search for a particular target, and, once the target has been located, to "lock" thereon and thereafter follow it while yielding a continuous indication of its range and of all changes that may occur with respect thereto.

Conventionally, range tracking in a radar is accomplished by gating the signal output of the video amplifiers, this signal having previously passed through the radar second detector, intermediate frequency amplifiers, and one or more mixers. A gating technique of this nature permits received signal energy to produce a visual representation on the "A-scope" of the radar only at prescribed intervals of time. However, such so-called video signal gating has the disadvantage of permitting interference which accompanies the target signal to pass through nearly the entire receiving unit of the radar, and, as a consequence, very little protection against these interference signals is available. While it has been proposed to carry out signal gating at the front end of the receiver (or, in other words, in the R-F portion thereof) such an expedient, while providing maximum interference rejection, nevertheless deteriorates the noise figure of the radar and results in an appreciable loss of lock-on sensitivity.

The matter of interference rejection is thus closely allied to the "lock-on" sensitivity of the radar. Consequently, it is of the highest importance, in the case of a range-tracking radar, to provide maximum rejection of undesired targets, clutter, ground return, atmospheric interference and unintentional jamming. While this problem has been recognized, it has not heretofore been practicable to carry out the signal-gating function in the early stages of signal processing due to the above-mentioned deterioration of the radar's signal-to-noise ratio, since the relatively poor sensitivity which would accompany a low S/N ratio has been considered to be unavoidable.

It has now been found that the process of gating the incoming energy to the radar so that essentially all of the interference signals are precluded from appearing in the video presentation may be performed in the R-F section of the radar without causing any appreciable reduction in the noise figure of the receiver. Inasmuch as the radar incorporates a local oscillator the output of which is mixed with the incoming signal energy and then fed to the intermediate frequency amplifiers, it has been discovered that this local oscillator may be periodically "pulsed" in time coincidence with the range-gate pulse developed during the radar tracking operation so that the oscillator has an effective output, the initiation, duration, and termination of which coincide with corresponding aspects of the range-gate pulse. Expressed differently, this range-gate pulse, which moves across the visual presentation on the radar scope until such time as the radar acquires, or "locks-on," to a desired (or an undesired) target, also acts in effect as a switch to permit the output of the local oscillator to be supplied to the mixer of the radar receiver where it combines with the received signal energy. However, this local oscillator output is timed so that it only continues for the duration of the range-gate pulse, following which the oscillator output is again gated "off" and no signal appears in the I-F video section of the receiver for visual presentation on the radar scope. The result of such an arrangement is that all interference received at times other than the period covered by the range-gate pulse is prevented from passing to the radar I-F and video amplifiers, and the system consequently does not become saturated as would otherwise be the case in the presence of strong natural or man-made interference.

According to a feature of the present invention, therefore, the local oscillator of the radar receiver is "pulsed" in time coincidence with the range tracking gate pulse. Inasmuch as the latter pulse is present in conventional radars, it is utilized in a preferred embodiment of this invention to prevent the local oscillator signal from reaching the mixer except during the time interval of the range-gate pulse itself. Consequently, the output of the local oscillator can also be considered as being in the form of pulses which occur during the periods of desired radar performance. Throughout all of the remaining time, the radar is completely insensitive to incoming energy, since the local oscillator is, in effect, shut off, and there is a total lack of any visual presentation on the radar scope during such time. The operator of the radar, consequently, views only the desired target on the scope, together with what little noise, if any, lies time-wise between the leading and trailing edges of the range-gate pulse. Since the radar inherently integrates all received noise throughout its operating cycle, the signal-to-noise ratio of the apparatus as a whole is considerably improved and its "lock-on" sensitivity significantly increased.

Inasmuch as only those target signals which arrive at the radar receiver in time coincidence with the radar range tracking gate pulse are permitted to pass through any of the receiver intermediate-frequency or video amplifiers, practically all extraneous targets and interference are consequently eliminated. During this interval of the tracking gate pulse, the radar receiver operates in completely normal fashion, with no loss whatsoever in sensitivity. However, at all other times, the radar is completely "blocked" to incoming signals, and therefore, as above mentioned, it will not become saturated or noisy in the presence of strong interference. One important aspect of this mode of operation is that if the target being tracked is attempting to jam the radar receiver, the high-level jamming signals will be gated by the range pulse into low-duty cycle energy which the radar will continue to track in bearing, even though the high interference level may prevent range track. Consequently, the system of the invention provides an efficient homing or direction-finding capability against sources of intentional jamming energy.

An additional feature of the present invention is that it can be employed in conjunction with, or parallel to, conventional methods of operation. In other words, instead of replacing such conventional methods, the system of the present invention may be advantageously incorporated into a standard radar so that a visual representation on the same scope may be obtained either of the output of the standard radar or of the energy received during the time occurrence of the range-gate pulse. Furthermore, these two distinct visual presentations are selectively available to the radar operator merely through the manipulation of a simple switch, so that a ready comparison between the two modes is available. By incorporating the apparatus of the present invention directly into a conventional radar so that either presentation is available for comparison purposes, the range-gate pulse may "look at" only a small segment of the total range, while the normal mode of operation provides full-range information to the radar observer prior to "lock on." Since the range-gate pulse moves across the radar scope toward a subsequent target following its release from a target previously acquired, it is highly desirable that such a "back and forth" presentation be available to the radar operator so that he will be able to distinguish desired targets from those which are of no interest, and hence ensure that the range-gate pulse has locked on (or is about to lock on) the particular target which it is desired to acquire.

One object of the present invention, therefore, is to provide means for selectively controlling the local oscillator of a range tracking radar to provide improved system performance in an interference environment.

An additional object of the invention is to raise both the signal-to-noise ratio and the lock-on capabilities of a tracking radar.

Another object of the present invention is to provide a radar system in which the local oscillator of the radar receiver is pulsed in time coincidence with the open periods of the radar range gate.

A further object of the invention is to provide a radar system in which there is alternately available to the radar operator a visual presentation of the full radar range as well as a presentation depicting incoming signal energy indicative essentially only of the particular target which it is desired to follow.

Other objects and many of the attendant advantages of this invention will be readily appreciated as the same becomes better understood by reference to the following detailed description when considered in connection with the accompanying drawings wherein:

FIG. 2 is a somewhat schematic showing of typical presentations produced on the scope of the radar system of which FIG. 1 is a part both during periods of conventional operation and during the time when the apparatus of applicant's concept is being utilized;

Figure 1:
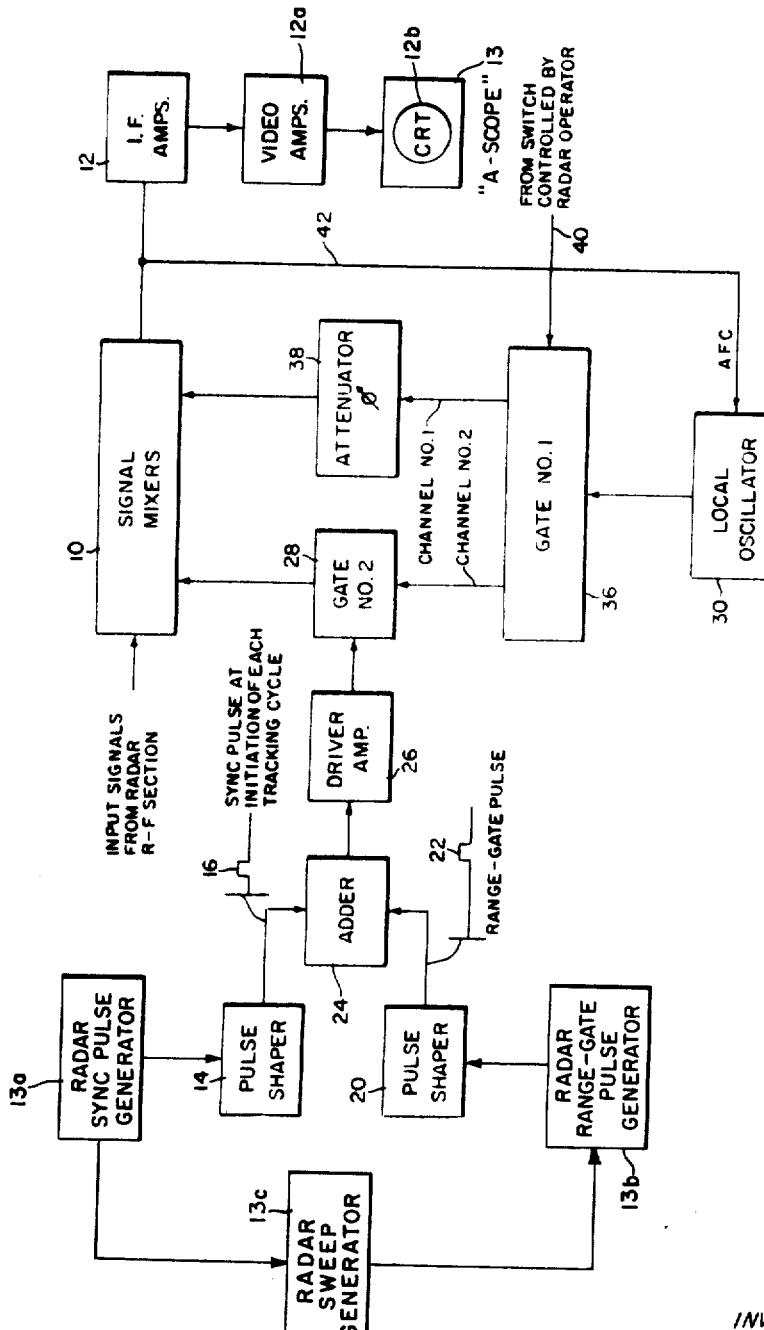
FIG. 1 is a block diagram of a portion of a standard range-tracking radar into which the principles of the present invention have been incorporated.

Referring now to the drawings, there is shown in FIG. 1 a portion of the receiving section of a typical range-tracking radar system, such for example as that known by the designation AN/APQ-51. Although the complete receiving unit includes a number of components in addition to those illustrated, nevertheless only those particular circuit elements which are of importance from the standpoint of the present invention need be considered in connection with the following description. For example, it is assumed that the range-tracking radar system with which the present concept is concerned incorporates the usual means for intercepting radiant energy and supplying this received energy in the form of signals through one or more R-F stages to a signal mixer network 10. The latter may be of standard design, and hence has been illustrated in block fashion in the drawing. The output of the signal mixer network 10 passes through one or more I-F amplifiers 12 and then is acted upon in conventional fashion by the usual video amplifiers 12a following which it is supplied to a cathode-ray image-reproducing tube 12b where it appears as a visual presentation upon the fluorescent screen thereof. The cathode-ray tube 12b forms part of a standard "A-scope" 13 the design of which is well known in the art.

This range-tracking radar, a portion of which is shown in FIG. 1, is further assumed to incorporate certain other components which are customarily found in such systems. These include, for example, a synchronizing pulse generator 13a and a range-gate pulse generator 13b, the latter receiving the output of the pulse generator 13a through a sweep generator 13c which acts to shift the phase of the sync pulses generated by the device 13a. The output of the synchronizing pulse generator 13a is also acted upon by a shaper network 14 to develop output pulses of essentially rectangular form, one representative pulse being designated by the reference numeral 16. Each pulse 16 acts as a timing pulse to control the instant at which a pulse is transmitted from the radar system, this instant of pulse transmission also marking the beginning of each operating cycle of the radar. This method of operation conforms in every sense with standard practice in systems of this type, and it will be seen by reference to FIG. 2a (which illustrates the screen of the cathode-ray tube 12b) that the pulse 16 of FIG. 1 coincides time-wise with the transmitted pulse 18, the latter also acting as a zero marker in the range presentation developed on the radar scope and which may be observed by the radar operator. It appears on the A-scope of FIG. 2a as a result of energy "leaking" through the T-R switching elements of the assembly.

Figure 2:
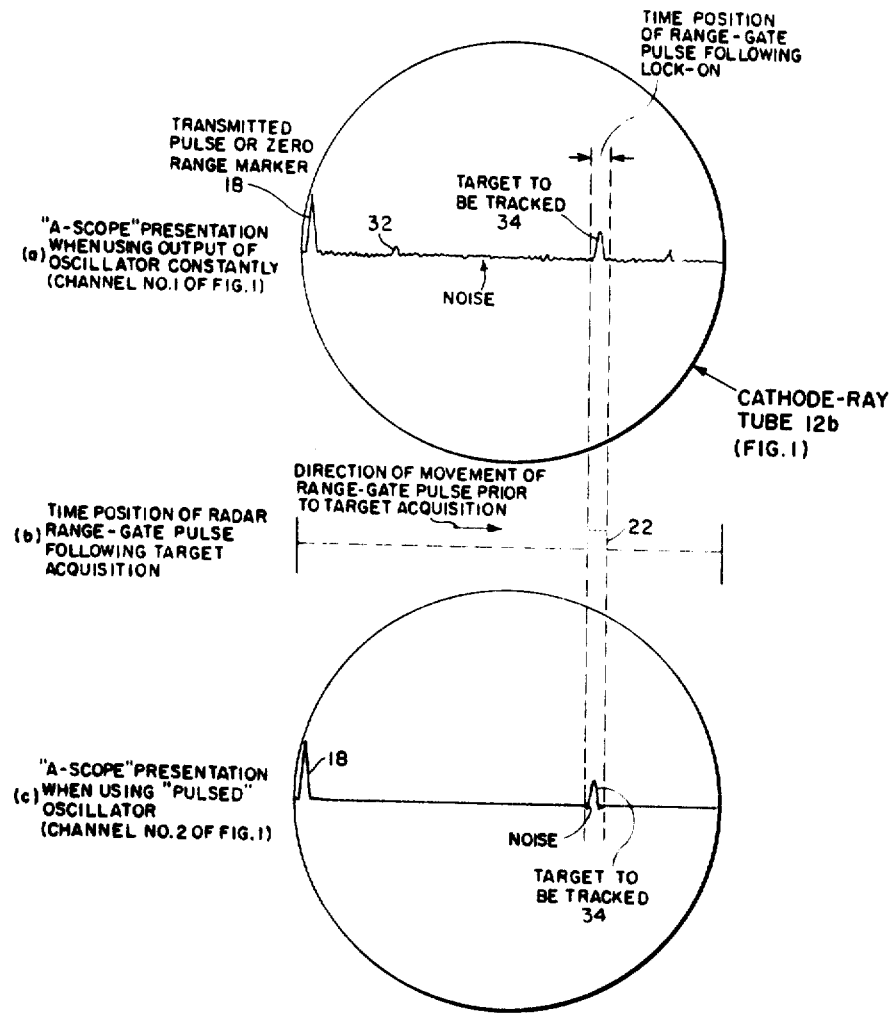

The radar system, of which the showing of FIG. 1 constitutes one portion, also incorporates a further pulse shaper 20 which receives the output of the range-gate generator 13b and develops therefrom an output pulse which is also of substantially rectangular configuration, as indicated by the reference numeral 22. This range-gate pulse 22 is shown in FIG. 2b solely to bring out its time relationship with the visual presentation developed on the radar scope. It will be understood, of course, that this range-gate pulse 22 changes its position time-wise with respect to the transmitted pulse, or zero range marker, 18 during each tracking cycle. In other words, the radar system being described operates so that the range tracking pulse 22 moves across, or scans, the entire range of the radar as depicted on the scope of FIG. 2a; this scanning movement continuing until such time as there is present in the radar receiver circuits a signal representative of a target. When this range-gate pulse "sees" such a target indication, its movement ceases, and it remains "locked on" such target pulse unless and it is released therefrom by some positive action on the part of the radar operator. Expressed differently, the radar operator normally has under constant observation the entire range picture (such, for example, as the one in FIG. 2a) and he also has at the same time on a separate instrument an indication as to the instantaneous position of the range-gate pulse 22 insofar as its location is concerned with respect to its distance from the zero range marker (or transmitted pulse) 18. Consequently, the radar operator is continually aware of whether or not the range-gate pulse 22 has locked on (or is in a position to lock on) the desired target rather than on a target or some other indication which is of no interest at that time.

Referring again to FIG. 1, it will be noted that the respective outputs of the pulse shaper 14 and the pulse shaper 20 are combined in an adder 24 and then fed through a conventional driver amplifier 26 to a gate 28. The function of gate 28 will be described in connection with the selective application to the signal mixer 10 of energy generated by a local oscillator 30 which again may be of well known design.

In order to develop signal energy of the proper frequency for application to the I-F amplifiers 12 of the radar system of FIG. 1, it is necessary that the input signals from the radar R-F amplifiers be combined with the output of the local oscillator 30 in the mixer network 10. Consequently, in conventional systems, the local oscillator 30 supplies output energy directly to the mixer 10 so that there is always present in the outpput of the latter a signal which includes all objects within the range capabilities of the system. However, as previously discussed, this mode of operation permits undesired signals to reach the radar I-F and video amplifiers, these undesired signals representing clutter, ground return, atmospheric interference and unintentional jamming which may appear as undesired "pips" on the radar scope of FIG. 2a such, for example, as that indicated by the reference numeral 32. The range-gate pulse, in scanning the incoming energy, consequently locks on to a pulse such as 32 and must be manually released therefrom by the radar operator. The range-gate pulse then moves to the next discernable target to lock thereon, and this process is repeated throughout the entire radar range. However, as soon as the range-gate pulse locks onto the target which it is desired to acquire, it remains locked thereon and follows such target regardless of any positional changes that may subsequently occur with respect thereto.

The above-described operation is conventional in range tracking radars of the type under discussion. As will be noted from an inspection of FIG. 2a, the visual presentation in such conventional systems includes representations of much incoming energy having no connection whatsoever with the target to be tracked; this energy, as above stated, being produced as a result of atmospheric interference, ground clutter, etc. In accordance with a principal objective of the present concept, this undesired energy is largely eliminated, while at the same time the overall performance of the radar receiver is raised to a point which has heretofore been incapable of attainment.

The objective sought by the present invention, consequently, is to preclude passage of input signals to the radar receiver amplifier circuits *except* during the period of a returned radar pulse, this selective signal "gating" occurring as closely to the "front end" of the radar receiver as possible in order to prevent a deterioration of the signal-to-noise ratio of the apparatus and to prevent the receiver from becoming saturated by high-level jamming. The optimum point for such control is prior to the mixing network in which R-F signals are converted to an intermediate frequency. It has been discovered that particularly efficient control along the lines mentioned may be attained by regulating the output of the local oscillator of the receiver so that this oscillator supplies energy to the mixer network only during desired intervals. If the local oscillator can be pulsed, for example, in time coincidence with the generation of the range-gate pulse, then there will be an output from the mixer of the radar receiver only during those time intervals which are correlated range-wise with the instantaneous position of the range-gate pulse as it scans progressively over the effective range of the radar receiver.

In a preferred mode of operation of the present invention, only input signals arriving at the radar receiver in time coincidence with the radar range-gate pulse are mixed with the output of the local oscillator, and hence only such signals are permitted to pass through any of the intermediate-frequency amplifiers. This eliminates all extraneous targets and other interference occurring timewise outside the boundaries of the range-gate pulse at any given instant of time. The video presentation in such a situation is illustrated in FIG. 2c, which brings out the total lack of noise and other undesired indications both before and after the occurrence of the range-gate pulse 22 following the latter's acquisition of a desired target (reference numeral 34). During the time interval of the range-gate pulse 22, the radar receiver exhibits all of its normal characteristics, with no degradation of its sensitivity. However, at all other times, the radar is completely insensitive to any received signals (as shown in FIG. 2c) and therefore does not become saturated or noisy in the presence of strong interference. Furthermore, if the target to be tracked is attempting to jam the radar receiver, the high-level interference will be gated by the pulse 22 into low-duty-cycle energy which the radar receiver will continue to track in bearing, even if the high level of interference precludes range tracking. This provides an automatic homing, or direction finding, capability against such jamming sources.

A preferred means for carrying out the above objectives includes not only the gate 28 of FIG. 1 but also a further gate 36. For convenience of description, this latter gate 36 will be designated as gate #1, while the previously-mentioned unit 28 will be designated as gate #2. As shown in FIG. 1, the output of the local oscillator 30 is switched by gate #1 into either of two channels, the first channel leading through a conventional attenuator 38 to the signal mixer 10. The other output path from gate #1 (that is, channel #2) leads through gate #2 to the signal mixer 10. Gate #1 may be of any conventional type that permits selective application of input signals from the local oscillator 30 to either channel #1 or channel #2. On the other hand, gate #2 is merely of the "on-off" type, and is intended to be opened only during the application thereto of one of the rectangular pulses 16, 22 as applied thereto from the driver amplifier 26. Gate #1, which has been stated to be of a nature which selectively connects the local oscillator to either of channels #1 or #2, is controlled by the radar operator, and may be, for example, a ferrite circulator intended to receive control energy through the conductor 40 such that the presence of a positive D.-C. potential switches the local oscillator 30 to channel #1, while the presence of negative D.-C. energy switches the local oscillator output to channel #2. Such ferrite circulators are well known in the art and readily available. Obviously, however, other switching networks may be employed if desired. Gate #2, on the other hand, while preferably also of the ferrite type, is, as above stated, intended to be opened only upon the application thereto of one of the pulses 16 or 22 from the driver-amplifier 26.

It will now be appreciated that the portion of the radar receiver illustrated in FIG. 1 of the drawings includes two paths over which the output of the local oscillator 30 may be conveyed to the signal mixer network 10. From the previous discussion, it will be recognized that channel #1 may be designated as the standard, or conventional, means for supplying a local oscillator signal to the mixer network 10, while channel #2 is the path followed by the local oscillator output when the system is operating in the manner provided for by the present invention.

When it is desired to display upon the radar scope a conventional presentation (that is, of the nature illustrated in FIG. 2a) then the radar operator will selectively actuate a switch (not shown) to establish a D.-C. potential in the conductor 40 which is suitable to place gate #1 in a condition such that local oscillator energy is conveyed through the attenuator 38 to the mixer network 10. The attenuator 38 is merely for regulating the magnitude of the local oscillator output so that it will be of proper strength to mix with the incoming energy from the radar R-F amplifiers, and may in some cases be omitted if the respective signals are initially adequately balanced for intermixing.

On the other hand, should the radar operator desire an indication of the signal from the target being tracked without the inclusion therein of extraneous or undesired interference, he will actuate the manually-controllable switch (not shown) which (for example) reverses the polarity of the D.-C. potential appearing in conductor 40. This causes gate #1 to switch the output of oscillator 30 from channel #1 to channel #2, so that such energy will pass through gate #2 to the mixer network 10 depending upon the open-or-shut status of the gate. Since, however, gate #2 is closed to local oscillator energy at all times except during those periods when a pulse 16 or 22 is applied to the gate, the local oscillator output does not mix with the incoming R-F signal energy except during the periods of these two pulses, the mixer output during the sync pulse period acting to provide an AFC voltage for the oscillator 30 over a conductor 42. The pulse 16, moreover, is the pulse which controls the generation of the transmitted pulse 18 of FIG. 2a, the latter also acting (as previously stated) as the zero range marker in the video presentation of FIGS. 2a and 2c. Pulse 18 appears in the presentation of FIG. 2c as a result of internal signal leakage in the radar system. However, following this sync pulse time interval, the screen of the radar scope is, in effect, blanked due to the complete lack of any signal output from the I-F amplifiers 12 of FIG. 1. This condition prevails until the reception by gate #2 of a range-gate pulse 22 from the driver amplifier 26. At this instant of time (that is, following the leading edge of range-gate pulse 22) gate #2 is opened, and local oscillator energy reaches the mixer network 10. It continues to do so until the trailing edge of the range-gate pulse 22 closes gate #2 and again terminates any signal output from the mixer 10 to the I-F amplifiers 12. The radar screen of FIG. 2c thus returns to a state which includes no video display, or, in other words, it is in the same blanked condition as it was between the times of occurrence of the successive pulses 16 and 22. It will be obvious from a comparison of FIG. 2a that the video operator observes in the latter presentation substantially only (1) the zero range marker and (2) the target to be tracked, all intermediate noise and undesired visual variations being completely attenuated.

Figure 3:
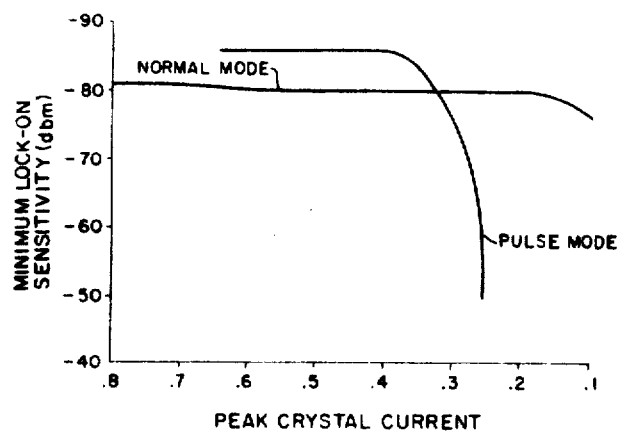
FIG. 3 is a graph useful in explaining the operation of the system of FIG. 1.

By incorporating applicant's novel apparatus into the system of a conventional radar, the operator thereof is provided with full-target or full-range information prior to lock-on. This enables the operator to make a very simple comparison test of the two modes of radar operation under actual conditions. If operation of the system in accordance with applicant's concept be designated as a "pulsed" mode of receiver operation, then it has been ascertained that a constant 6 decibel improvement in the lock-on sensitivity of the radar is obtainable, as will be recognized from an inspection of the graph of FIG. 3. This graph is a plotting of the radar's minimum lock-on sensitivity versus the peak current in the crystal which conventionally constitutes the mixer 10. However, other factors are also of importance, such as the improvement in AGC action resulting from the "pulse" mode of operation of the oscillator. With a conventional radar operating in its normal mode with a lock-on sensitivity of minus 80 decibels with respect to a milliwatt (dbm) it has been found that the incorporation therein of applicant's particular "pulse" technique results in this lock-on sensitivity figure being raised to minus 86 dbm. This improved performance is due in part to the higher conversion efficiency of the crystals in the mixer 10, as well as the difference in AGC action resulting from the "pulse" action of the local oscillator 30. It is recognized, however, that this above-mentioned increase in lock-on capability would not be in itself significant if it resulted in a degradation of system performance in an ECM environment. However, exhaustive tests have demonstrated that when employing the "pulse" mode of operation, approximately 15 decibels more jamming power is necessary to break lock in comparison with that required during normal or conventional operation.

All of the above factors taken together thus yield a highly significant improvement in the operating capabilities of the radar. The increase in lock-on sensitivity alone provides an increase in lock-on range of 42%, or, expressed in another way, the radar will lock-on to a target one-fourth the size of a target which could be acquired in the normal mode of operation at the same range. To modify a standard radar in order to achieve comparable results would mean doubling the aperture size of the antenna, or, alternatively, would necessitate increasing the power output of the magnetrons by a factor of 4. A still further advantage of applicant's disclosure is that it is very readily incorporated into standard systems while requiring only minor changes in the existing circuitry.

Figure 4:
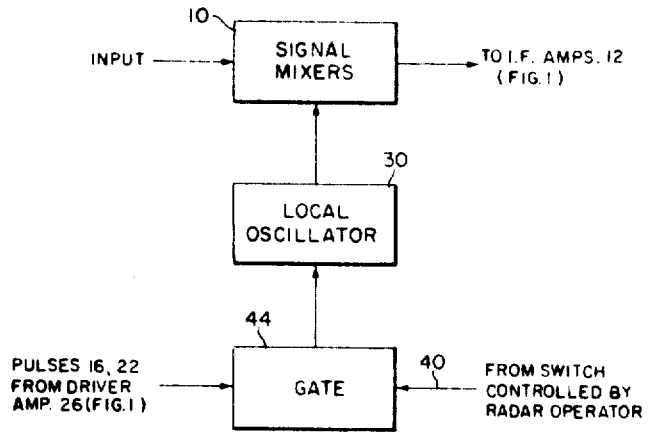
FIG. 4 is a block diagram of a modified form of oscillator control.

If the radar receiver possesses a large bandwidth, the modification of FIG. 4 may be employed. In this embodiment, the local oscillator 30 is pulsed *directly* so that it is actually operative only during the time periods of the pulses 16, 22. In other words, these latter pulses turn the oscillator on and off at the prescribed instants. Such excitation and subsequent quenching of the oscillator tends to develop large transients, however, which may be objectionable unless adequate compensation is provided or unless the band-width of the radar is quite large. The unit 44 of FIG. 4 is a conventional gate which is opened by the reception over conductor 40 of control energy from the radar operator-controlled switch to permit passage therethrough of the sync and range-gate pulses 16, 22 so that the latter pulses may determine the periods during which the local oscillator 30 is active.

Obviously many modifications and variations of the present invention are possible in the light of the above teachings. It is therefore to be understood that within the scope of the appended claims the invention may be practiced otherwise than as specifically described.

I claim:

1. In a tracking radar of the type in which a video presentation is developed on the screen of a cathode-ray tube for observation by an operator, such video presentation normally including all range information within the capabilities of the radar as well as noise and, when present, indications of unwanted targets and jamming signals either intentionally or unintentionally generated, in addition to the indication representative of the particular target the acquisition and subsequent tracking of which is desired, the reception by the radar of such noise and unwanted energy tending to adversely affect the lock-on sensitivity of the radar, the combination of:

a constant-frequency local oscillator;
   circuit means for mixing the output of said local oscillator with the received signal energy to produce an intermediate-frequency signal;
   means to amplify such signal energy prior to application thereof to the cathode-ray tube on which the said video presentation is developed;
   means for generating a range-gate pulse adapted to scan the entire range tracked by the radar to cause the radar to lock-on to a target the time-wise position of which coincides generally with the instantaneous time-wise position of such range-gate pulse during a particular scan thereof;
   a circuit for applying the output of said local oscillator of the radar to said means for mixing in time coincidence with the leading edge of said range-gate pulse and for removing the output of the local oscillator from said means for mixing in time coincidence with the trailing edge of said range-gate pulse, so that the output of the oscillator is mixed with the received signal energy only during time periods coinciding with those occupied by the range-gate pulse and with no output energy from the local oscillator being mixed with the received signal energy outside of such time periods;
   the signal-to-noise ratio of the system being consequently raised inasmuch as no noise or other unwanted signal energy appears in those portions of the radar receiver which follow the signal-mixing means outside of such range-gate pulse time periods, the improvement in the radar's signal-to-noise ratio correspondingly improving the lock-on sensitivity of the system as compared to that which would prevail were the noise and unwanted energy to pass completely through the receiver at all times and appear as a presentation on the screen of said cathode-ray tube.

2. The combination of claim 1, in which the circuit for applying the output of said local oscillator of the radar to said means for mixing in time coincidence with the leading edge of said range-gate pulse and for removing the output of the local oscillator from said means for mixing in time coincidence with the trailing edge of the range-gate pulse includes:

a switching unit connected between said local oscillator and the said means for mixing the local oscillator output with the signal energy received by the radar, such switching unit being receptive to, and under the control of, the said range-gate pulses, so as to be open, following the initiation of an operating cycle, substantially only during the time duration of a range-gate pulse, whereby no oscillator energy is received by the signal mixing means at any time following the initation of an operating cycle other than that during which a range-gate pulse is being applied to said switching unit.

3. The combination of claim 2, further comprising:

a direct electrical connection between said local oscillator and said mixing means, such direct connection effectively paralleling that which includes said switching unit; and a further switch receiving the output of the local oscillator and applying the same to said mixing means selectively through said direct electrical connection and through said first-mentioned switching unit in which it is time-controlled by pulses from said range-gate pulse generator.

4. In a radar tracking system of the type incorporating a local oscillator and in which signal pulses of radiant energy are periodically transmitted toward an object from which they are subsequently reflected, such reflected signal pulses being then received by said radar system and mixed with the output of the local oscillator, said radar tracking system including:

means for generating a gating pulse that recurs at the rate of said periodic transmission;

means for shifting the phase of said gating pulse with respect to said periodic transmission at a rate which is relatively slow compared to such transmission period so that the system passes only those received signal pulses which are reflected from an object located at a distance from said radar corresponding to the instantaneous phase of said gating pulse;

means for increasing the signal-to-noise ratio of said radar system, said signal-to-noise-ratio-increasing means including a switch through which the output of said local oscillator passes to be mixed with the reflected signal pulses received by said system; and means for applying said gating pulses to said switch to control the latter so that it is open substantially only during time periods coinciding with the occurrence of the respective gating pulses.

5. In a radar tracking system of the type incorporating a local oscillator and in which signal pulses of radiant energy are periodically transmitted toward an object from which they are subsequently reflected, such reflected signal pulses being then received by said radar system and mixed with the output of said local oscillator, said radar system including:

means for generating a gating pulse that recurs at the rate of said periodic transmission;

means for shifting the phase of said gating pulse with respect to said periodic transmission at a rate which is relatively slow compared to the transmission period so that the system passes only those received signal pulses that are reflected from an object located at a distance from said system which corresponds to the instantaneous phase of said gating pulse; and means for increasing the signal-to-noise ratio of said tracking system, said last-mentioned means including a circuit for applying said gating pulses to said local oscillator so that operation of the latter is initiated by the reception of the leading edge of each gating pulse and terminated by the reception of the trailing edge of such gating pulse.

References Cited by the Examiner

UNITED STATES PATENTS 2,482,128   9/1949   Schmid _____ 343—17.1

CHESTER L. JUSTUS, *Primary Examiner.*

T. H. TUBBESING, *Assistant Examiner.*